United States Patent Office.

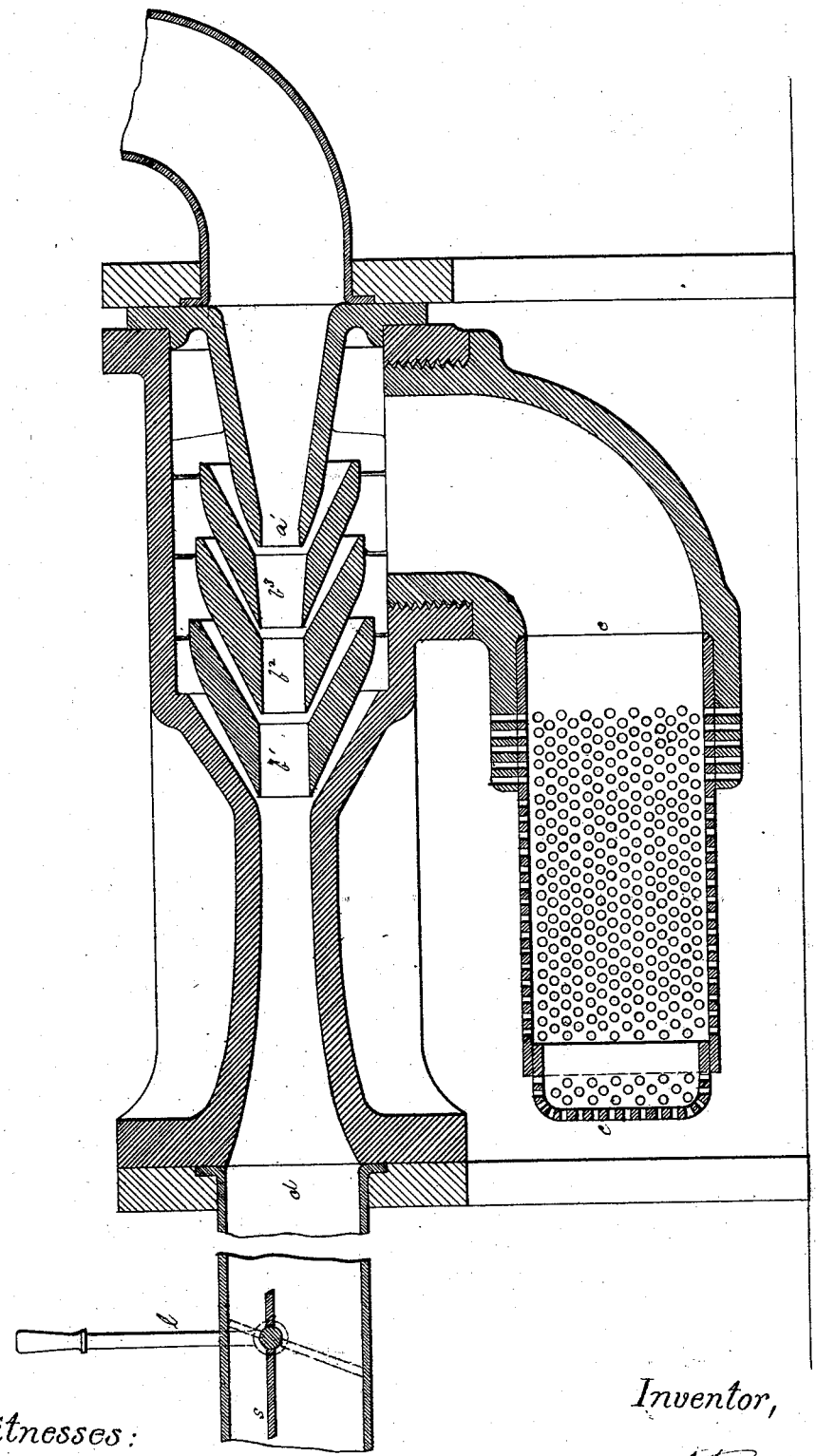

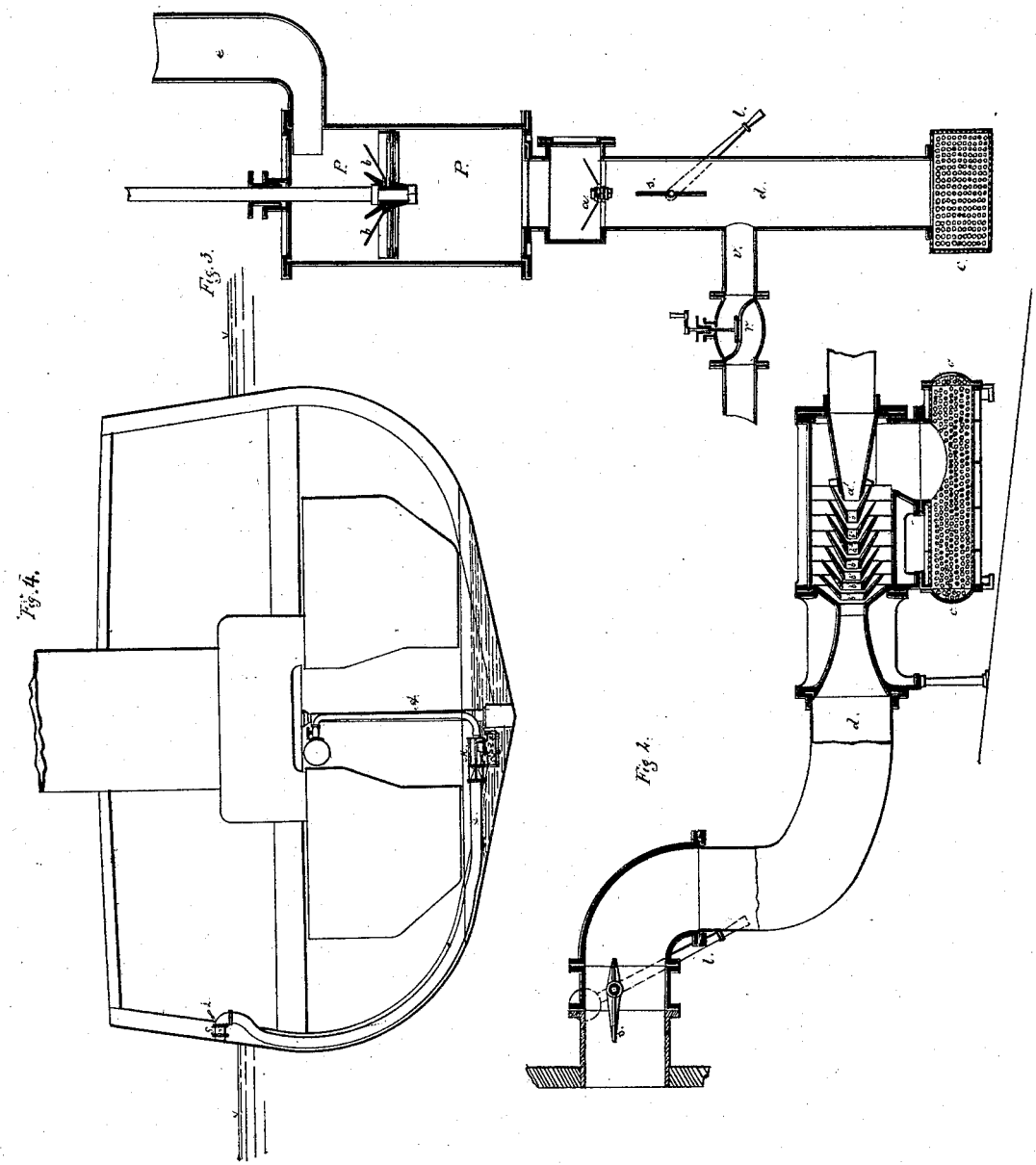

ALEXANDER FRIEDMANN, OF VIENNA, AUSTRIA.

Letters Patent No. 106,683, dated August 23, 1870.

IMPROVEMENT IN STEAM-PUMPS.

The Schedule referred to in these Letters Patent and making part of the same.

I, ALEXANDER FRIEDMANN, of Vienna, in Austria, have invented certain "Improvements in Pumps," of which the following is a specification.

These improvements consist essentially in a device for cleaning the suction filters of pumps by means of steam.

They are applicable to any kind of pumps for raising bilge-water or other impure liquids, but I have found them especially applicable to my injector-pump, patented in the United States by Letters Patent dated 6 April, 1869, in which injector-pump I provide, in proportion to the diameter of the steam-nozzle, one or more intermediate pipes, so that the forced liquid at the circumference, notwithstanding its great total bulk, will be always mixed in very thin stratas with the driving steam-jet, which will be always in the center, whereby the steam is only gradually condensed and the shock is very much reduced.

Now, my process for cleaning the suction filters consists in forcing the steam (entering the suction-pipe of a pump for the purpose of raising the bilge-water or other liquids) by means of a valve or throttle-valve or cock, placed in the suction-pipe or delivery-pipe of the pump, and above the mouth of the steam-pipe, and to pass down through the suction filter, blowing out the holes and cleaning it from all obstructions.

To enable others skilled in the art to make and use my invention, I will now proceed to describe the construction and operation of my contrivance, reference being had to the annexed drawing making a part of this specification, in which—

Figure 1, Plan I, shows the longitudinal section of one of my smallest pumps, patented in the United States by Letters Patent dated 6 April, 1869, and now provided with a throttle-valve for cleaning the filter.

$a'$ is the steam-outlet.
$b^1$ $b^2$ $b^3$ are the intermediate pipes.
$c$ is the suction filter.
$d$ is the delivery-pipe.
$s$ is the intercalated throttle-valve.
$l$ is the lever to shut this valve, when required.

Figure 2, Plan II, is the longitudinal section of one of my large patented pumps, provided with suction filter and the throttle-valve for cleaning the same.

$a$ is the steam-outlet.
$b^1$ $b^2$ $b^3$ $b^7$ are the intermediate pipes.
$c$ is the suction filter.
$d$ is the delivery-pipe.
$s$ is the intercalated throttle-valve.
$l$, the lever.

Figure 4, Plan II, is the transversal section of a steamer, provided with one of my patented pumps, supplied with throttle-valve for cleaning the filter.
M is my patented pump.

A is the steam-pipe.
C is the filter.
D is the delivery pipe.
S is the throttle-valve.
L is the lever.

Figure 3, Plan II, is the longitudinal section of an ordinary pump, provided with apparatus for cleaning the filter.
P is the body of the pump.
$a$ is the suction-valve.
$b$, the delivery-valve.
$c$ is the suction filter.
$d$ is the suction-pipe.
$e$, the delivery-pipe.
$s$ is the throttle-valve, intercalated either in the suction-pipe or in the delivery-pipe.
$l$ is the lever.
$v$ is the steam-pipe, entering the suction-pipe below the suction-valve.
$r$ is the steam-cock or valve, to be opened or shut as required.

To clean the filter of my patented pump, fig. 4, Plan II, the pump being at work, the throttle-valve $s$ is shut for some seconds; then, the steam blowing out of the steam-nozzle $a$, cannot take its former direction, but must return through the water-passages of the intermediate pipes, enter the suction filter $c$, and blow out of its holes, thus cleaning it perfectly from any matter stopping up.

On opening again the throttle-valve, the steam takes its ordinary way forward, and the pump works as before.

To clean the filter of an ordinary pump, fig. 3, Plan II, shut the throttle-valve $s$ and open the steam-cock or valve $r$; then the steam will blow through the filter and clean it. Shutting again the cock or valve $r$, and opening the throttle $s$, the pump will work as before.

What I claim as new, and desire to secure by Letters Patent, is—

1. The combination and arrangement of a valve or throttle-valve, $s$, in the delivery-pipe of a pump, to be kept open whenever the liquid is discharged, but to be shut from the outside when required, for the purpose of cleaning the suction filter of the injector patented by me in the United States by Letters Patent of April 6, 1869.

2. A valve or throttle-valve or cock, $s$, in the delivery-pipe or suction of the apparatus, and of a steam-pipe, $v$, provided with a valve or cock, $r$, entering the suction-pipe below the suction-valve, for cleaning the suction filter of any apparatus for raising or forcing fluids, substantially as described.

ALEX. FRIEDMANN.

Witnesses:
C. BROSBECK,
E. KÖRTING.